United States Patent
Joergl et al.

(10) Patent No.: US 9,097,121 B2
(45) Date of Patent: Aug. 4, 2015

(54) TURBINE CASING OF AN EXHAUST-GAS TURBOCHARGER

(75) Inventors: Volker Joergl, Breitenfurt (AT); Timm Kiener, Lake Orion, MI (US); Thomas Kritzinger, Frankenburg a. H. (AT); Stefan Weiss, Mannheim (DE); Sylvia Wuest, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 610 days.

(21) Appl. No.: 13/500,953

(22) PCT Filed: Oct. 22, 2010

(86) PCT No.: PCT/US2010/053644
§ 371 (c)(1),
(2), (4) Date: Apr. 9, 2012

(87) PCT Pub. No.: WO2011/053513
PCT Pub. Date: May 5, 2011

(65) Prior Publication Data
US 2012/0201655 A1 Aug. 9, 2012

(30) Foreign Application Priority Data

Oct. 30, 2009 (DE) .......................... 10 2009 051 539
Feb. 2, 2010 (DE) .......................... 10 2010 006 625

(51) Int. Cl.
*F01D 1/06* (2006.01)
*F01D 25/12* (2006.01)
(Continued)

(52) U.S. Cl.
CPC .............. *F01D 9/026* (2013.01); *F01D 17/105* (2013.01); *F01D 25/12* (2013.01); *F01D 25/145* (2013.01); *F02B 37/183* (2013.01);
(Continued)

(58) Field of Classification Search
CPC ....... F01D 9/026; F01D 25/12; F01D 25/145; F01D 17/105; F02B 37/182; F02M 25/0707; F02M 25/0709; F05D 2300/121; F05D 2260/231; F05D 2300/5024; F05D 2220/40; F05D 2230/90; F05D 2300/21
USPC ......... 415/114, 115, 116, 175, 176, 177, 178, 415/203, 204, 205, 206
See application file for complete search history.

(56) References Cited

U.S. PATENT DOCUMENTS

| 2,801,043 A | * | 7/1957 | Spotz et al. ................... 415/177 |
| 2,866,617 A | * | 12/1958 | Land .............................. 415/177 |
| 4,147,467 A | * | 4/1979 | Leicht et al. .................. 415/196 |
| 4,264,660 A | | 4/1981 | Siebels |

(Continued)

FOREIGN PATENT DOCUMENTS

| DE | 102008011257 A1 | 9/2009 |
| JP | H01247715 A | 10/1989 |

(Continued)

OTHER PUBLICATIONS

International Search Report and Written Opinion ; date of mailing Jul. 27, 2011; for International Application No. PCT/US2010/053644; 10 pages.

*Primary Examiner* — Igor Kershteyn
(74) *Attorney, Agent, or Firm* — BrooksGroup

(57) ABSTRACT

The invention relates to a turbine casing (1) of an exhaust-gas turbocharger (62), having an inlet connection piece (2) adjoined by a spiral (3), and having an outlet connection piece (4), characterized by an insulating device (5) for reducing the input of heat into the inlet connection piece (2), the spiral (3) and/or the outlet connection piece (4).

14 Claims, 12 Drawing Sheets

Figure 1:
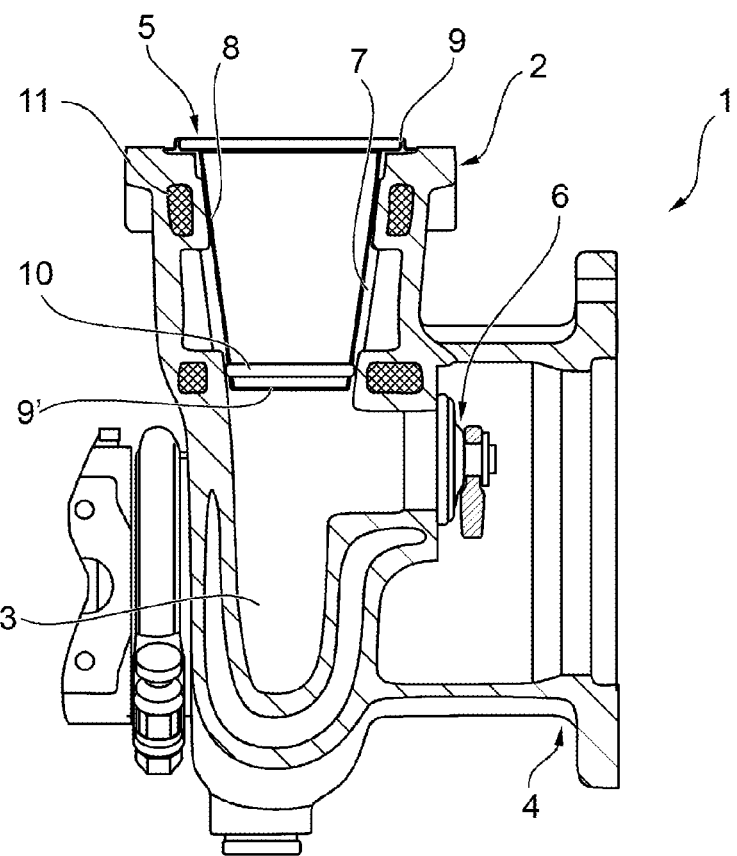

(51) Int. Cl.
  *F01D 9/02*    (2006.01)
  *F01D 17/10*   (2006.01)
  *F01D 25/14*   (2006.01)
  *F02B 37/18*   (2006.01)
  *F02M 25/07*   (2006.01)

(52) U.S. Cl.
  CPC ...... *F02M 25/0707* (2013.01); *F02M 25/0709* (2013.01); *F05D 2220/40* (2013.01); *F05D 2230/90* (2013.01); *F05D 2260/231* (2013.01); *F05D 2300/121* (2013.01); *F05D 2300/21* (2013.01); *F05D 2300/5024* (2013.01); *Y02T 10/121* (2013.01); *Y02T 10/144* (2013.01)

(56) References Cited

U.S. PATENT DOCUMENTS

| | | | |
|---|---|---|---|
| 7,074,009 B2 * | 7/2006 | Allmang et al. | 415/177 |
| 7,469,689 B1 * | 12/2008 | Jones et al. | 415/178 |
| 2004/0109759 A1 * | 6/2004 | Korner | 415/205 |
| 2006/0133931 A1 * | 6/2006 | Burmester et al. | 415/204 |
| 2007/0089414 A1 | 4/2007 | Yokoyama et al. | |

FOREIGN PATENT DOCUMENTS

| | | |
|---|---|---|
| JP | H07139364 A | 5/1995 |
| WO | 2009106159 A1 | 9/2009 |
| WO | 2009106166 A1 | 9/2009 |
| WO | 2011053513 A2 | 5/2011 |

* cited by examiner

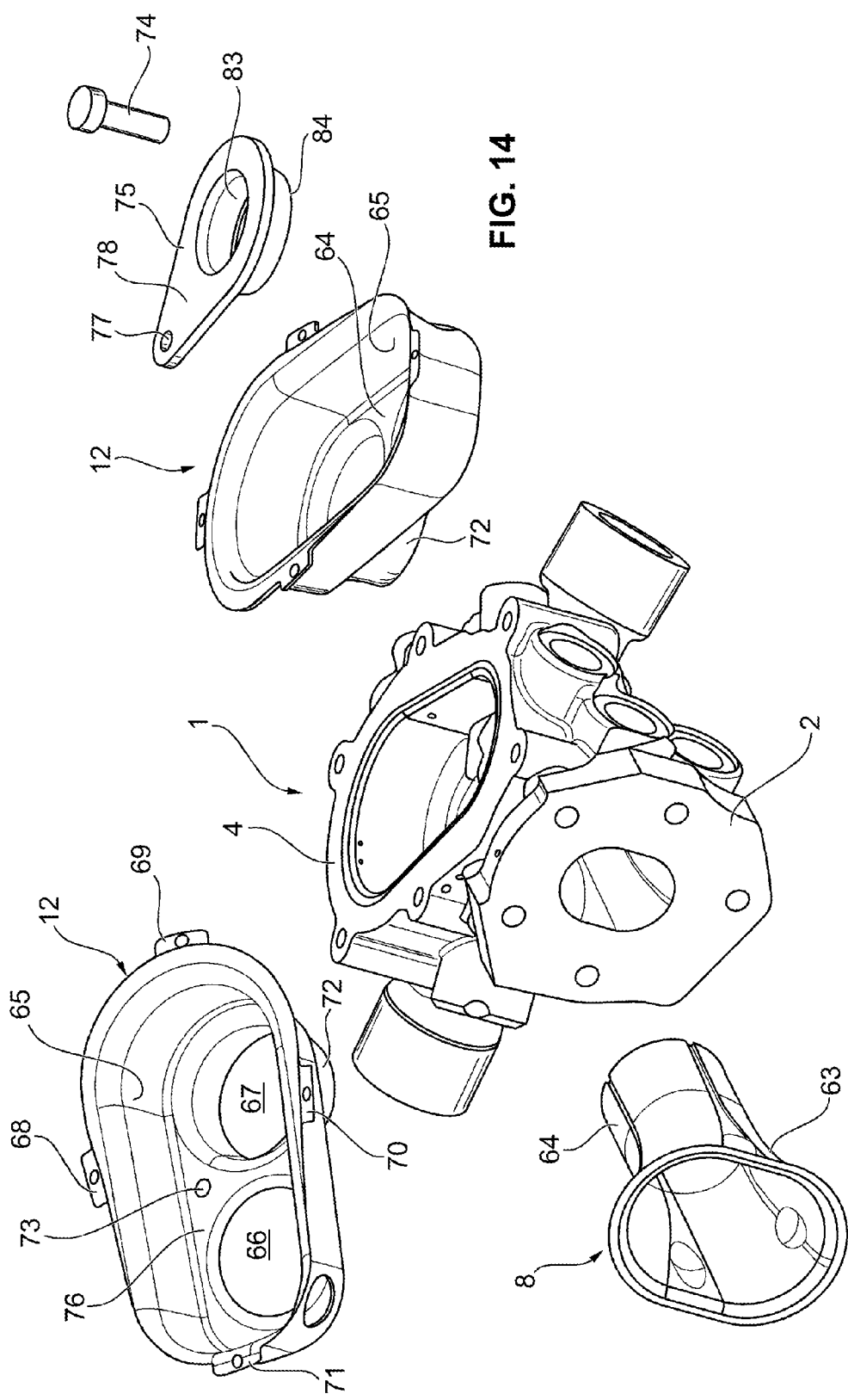

TURBINE CASING OF AN EXHAUST-GAS TURBOCHARGER

The invention relates to a turbine casing of an exhaust-gas turbocharger according to the preamble of claim 1.

A turbine casing of this type is known from DE 10 2008 011 257 A1. In the case of this turbine casing, shell elements are fastened to the outside of the turbine casing in order to form a hollow space in which coolant is conducted.

Although this type of coolant device, according to the information in DE 10 2008 011 257 A1, should make it possible to simplify the design and to achieve a smaller increase in weight of the turbine casing compared with other designs, the problem nevertheless remains that the input of heat into the turbine casing cannot be reduced; instead, only the negative effects of this heat input can be alleviated by the coolant device. There remains the further problem that, in particular for use in automobiles, cooled turbine casings inevitably require a relatively large installation space and, above all, increase the weight of the overall exhaust-gas turbocharger.

Therefore, it is an object of the present invention to provide a turbine casing of the type specified in the preamble of claim 1, which makes it possible to reduce the surfaces inside the turbine casing which are in direct contact with the hot exhaust gases, in particular with the hot exhaust gases which flow through at high speed, and, in particular, in the region of the turbine inlet and turbine outlet and also in the region of the wastegate duct.

This object is achieved by the features of claim 1.

The basic concept of the present invention is that excessive heat input is prevented from the outset, in order to be able to at least minimize the outlay for cooling measures, in particular in the case of cast aluminum turbine casings.

This is because the problems in terms of weight and installation space, as mentioned in the introduction, are present even in the case of cooled, in particular water-cooled, turbine casings, and these problems make it difficult to use these casings, primarily in the automotive sector. If however, the input of heat into the turbine casing, and in particular into the above-mentioned regions of the turbine casing, is prevented from the outset, this makes it possible to minimize the outlay for cooling, even if this should still be necessary, in order to make it possible to use these casings, primarily in the automotive sector.

The dependent claims describe advantageous developments of the invention.

Accordingly, the insulating device of the turbine casing according to the invention can comprise a sleeve or thermal insulating sleeve which can preferably be produced from high-temperature-resistant material. In particular, this sleeve can be fitted in the inlet region, in particular the inlet connection piece, and in the outlet region, in particular the outlet connection piece, within the turbine casing. For this purpose, the sleeve can be fixed by bolts or screwed connections. Alternatively, the sleeve can be pressed in or cast in or installed between existing flanges in a sandwich construction. Here, the sleeve can comprise one or more small-area contact or bearing points in the turbine casing, or it can be fixed only in the vicinity of the inlet or outlet flange, in which case the rest of the sleeve then extends without further support close to the inner wall of the turbine casing. The sleeve does not come into direct contact with the inner wall in any case, and this provides the possibility for gap formation.

Either this gap can contain air as a further insulating layer or, by way of example, a fiber mat which includes air cushions can be placed into this gap as a further insulating measure.

In a further conceivable preferred embodiment, it is possible to fix ceramic inlays on the inner walls of the turbocharger, in particular the above-mentioned regions, or to cast in such inlays.

It is also possible for the thermal insulating device according to the invention to comprise coatings which, for example, are sprayed onto the inner walls or fixed in some other way.

Finally, it is possible for the thermal insulating device of the turbine casing according to the invention to comprise a combination of any of the individual components mentioned above or else a combination of all of these components, to the extent that this is useful and feasible in technical terms.

A further conceivable measure is to carry the hot exhaust gases away from the inner walls of the turbine casino in order to reduce the flow rate close to the wall, and this contributes to a reduced transfer of heat from the exhaust gas into the casing.

For this purpose, it is possible, for example, to provide one or more flow baffle plates in the turbine casing, in particular in the inlet and outlet regions, in the region close to the wastegate opening and the tip of the tongue before the entry into the spiral of the turbine casing.

As a further alternative, the insulating device of the turbine casing according to the invention can comprise a wastegate arrangement which extends completely outside the turbine casing. Here, it is possible to branch off the wastegate duct in the region of the exhaust-gas manifold and to feed it into the exhaust tailpipe downstream of the turbine outlet, and therefore both the wastegate line and the wastegate valve are arranged outside the turbine casing.

Alternatively, it is possible to arrange only the wastegate line outside the turbine casing, since this accounts for the majority of the heat input, and to leave the wastegate valve itself in the turbine casing.

If an external wastegate valve is used, it is possible to provide this in the form of a non-cooled wastegate valve in a rigid casing or in the form of a cooled wastegate valve in a casing made from a suitable alloy. According to the invention, there is the further advantage that one valve can be dispensed with in the case of engines with two water-cooled turbochargers and an external wastegate valve (i.e. a wastegate valve which is arranged outside the turbine casing). The provision of such an external wastegate valve is advantageous in so far as the input of heat into the turbine casing can thereby be significantly reduced.

As a further alternative according to the invention, the insulating device can comprise a tongue which consists of iron or steel and can withstand relatively high temperatures. This steel or iron tongue can be cast into the casing, in particular a turbine casing which consists of aluminum, or installed in said casing by bolts. It is also possible to press the tongue into the casing or to design it as part of a steel or iron bushing. It is also possible to design the tongue as an integral part of a thermal insulating insert, as described above, or as a part welded onto this thermal insert. It is also possible for all the other regions of the turbine casing which may be poorly cooled to be produced from materials having a high thermal stability, such as in particular steel, and to be introduced into the turbine casing by casting in, screwing, pressing or other suitable measures.

As a further alternative, it is possible for the thermal insulating device to comprise a coolant system which is integrated in the turbine casing and the coolant inlet of which is arranged at the lowest point of the turbine spiral and the coolant outlet of which is arranged at the highest point of the turbine spiral. This arrangement is independent of the position of the turbine casing since the inlet is always at the lowest point of the spiral and the outlet is always at the highest point of the spiral, and therefore the coolant which heats up and therefore expands can flow from the bottom upward and thus brings about a thermal siphon effect.

It is also possible to arrange an annular coolant duct at the turbine casing outlet close to the region of the connecting flange between the turbine casing and the exhaust tailpipe system, in order to insulate the non-cooled casing region close to this region against excessive heat input. This measure can be combined with a further thermal barrier, for example in the form of a seal or other thermal decoupling elements, or these further thermal decoupling elements alone can also bring about thermal insulation in this region, in order to prevent or minimize the input of heat into the turbine casing. This measure is important particularly when, when the engine is switched off, the heat input downstream of the turbine casing through the adjoining exhaust tailpipe system can become very high, if no thermal insulation measures are taken.

Finally, it is possible to provide a cooling fin arrangement as an additional thermal insulating device on the outside of the turbine casing, in which case it is possible, when the turbocharger is installed, to force an air flow over these cooling fins and to use materials with good heat discharge properties.

All of the above-mentioned measures and possible designs for the thermal insulating device according to the invention can in each case be undertaken individually or in any conceivable and technically useful combination.

Figure 2:
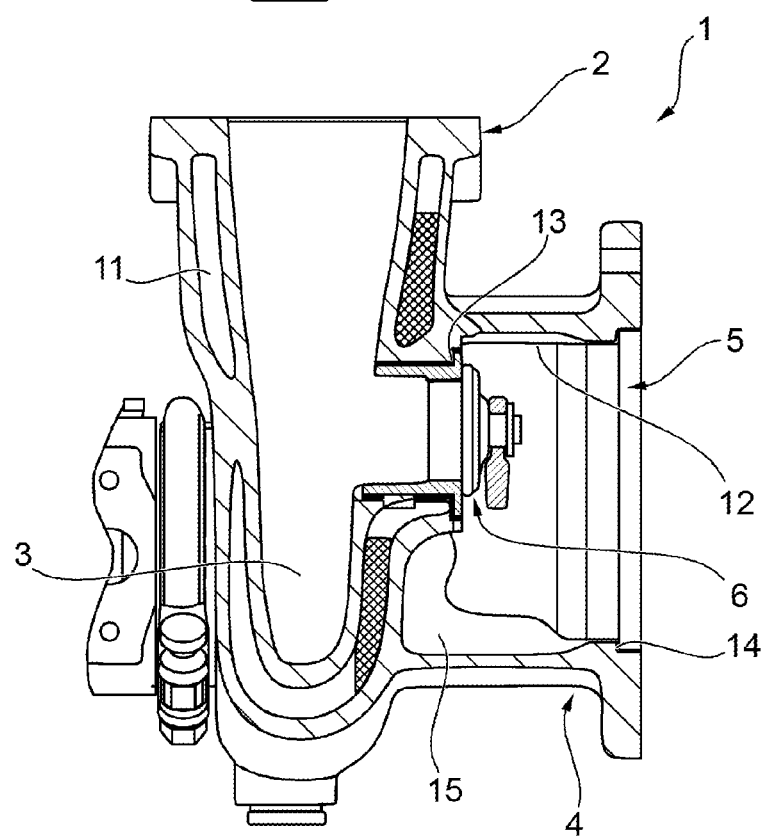
Figure 3:
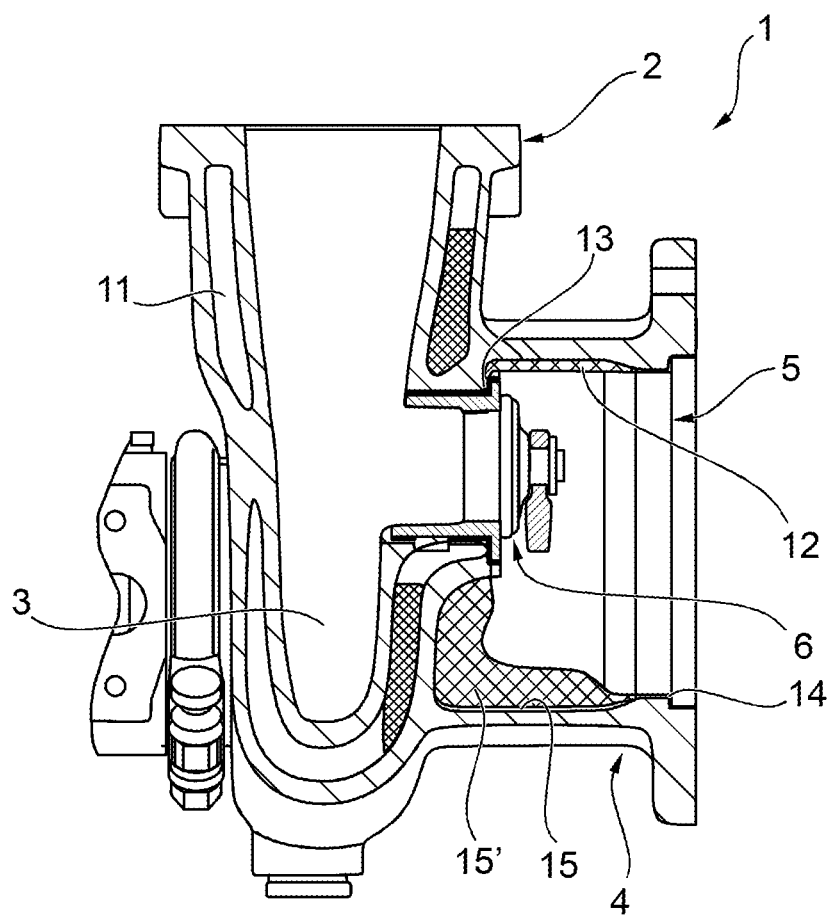
Figure 4:
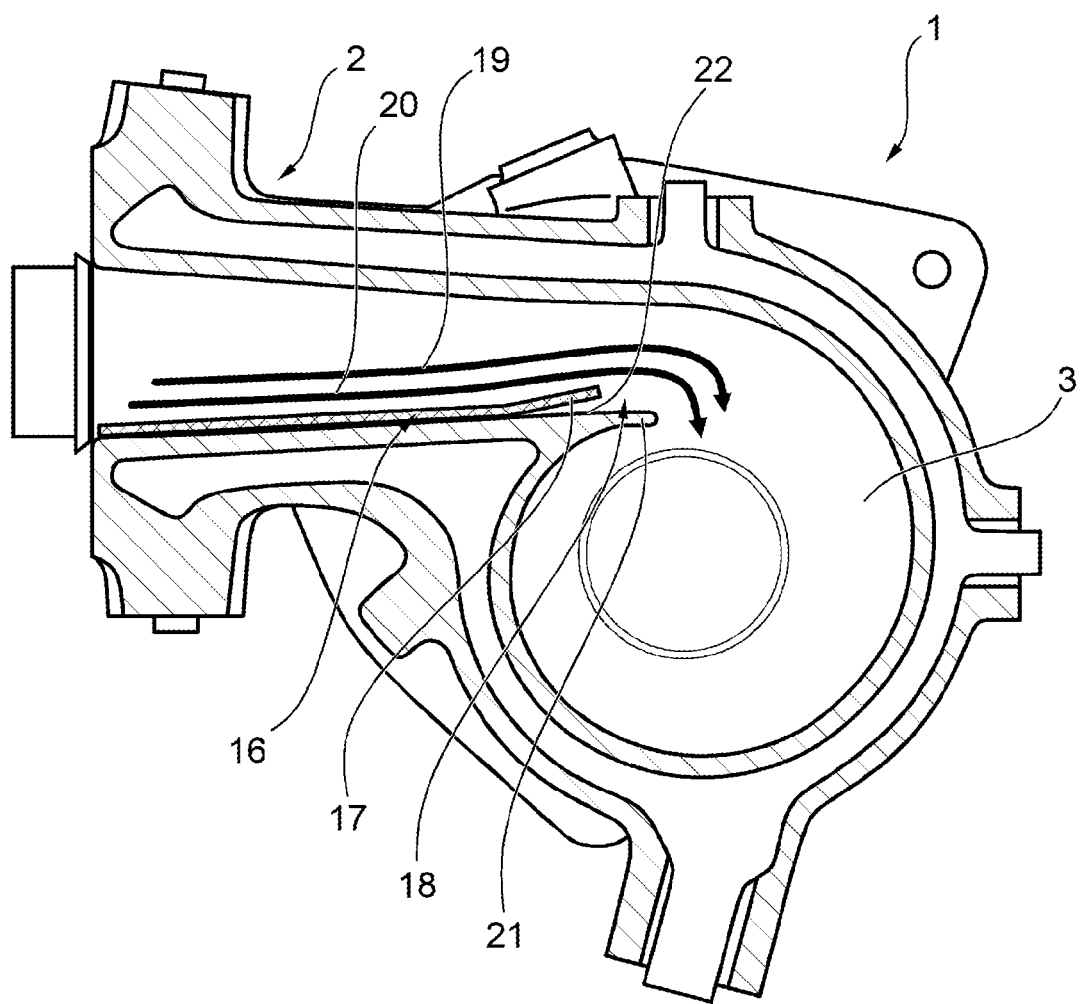
Figure 5:
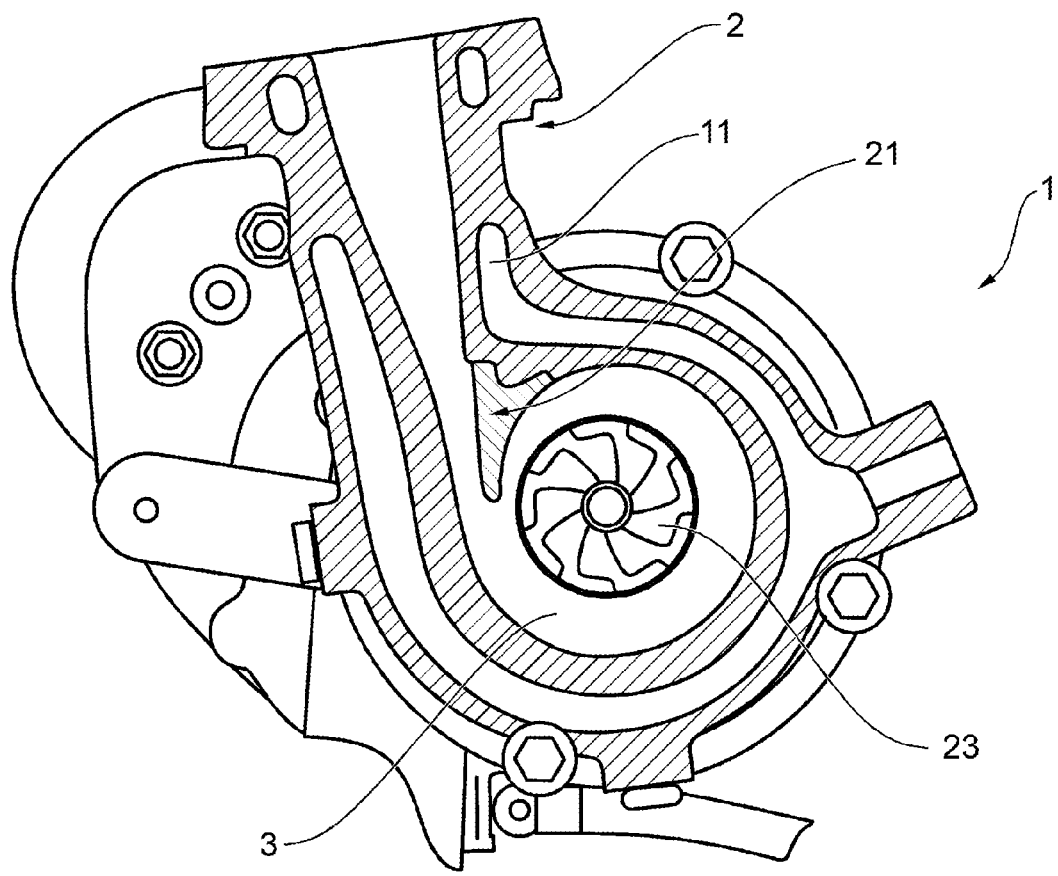
Figure 6:
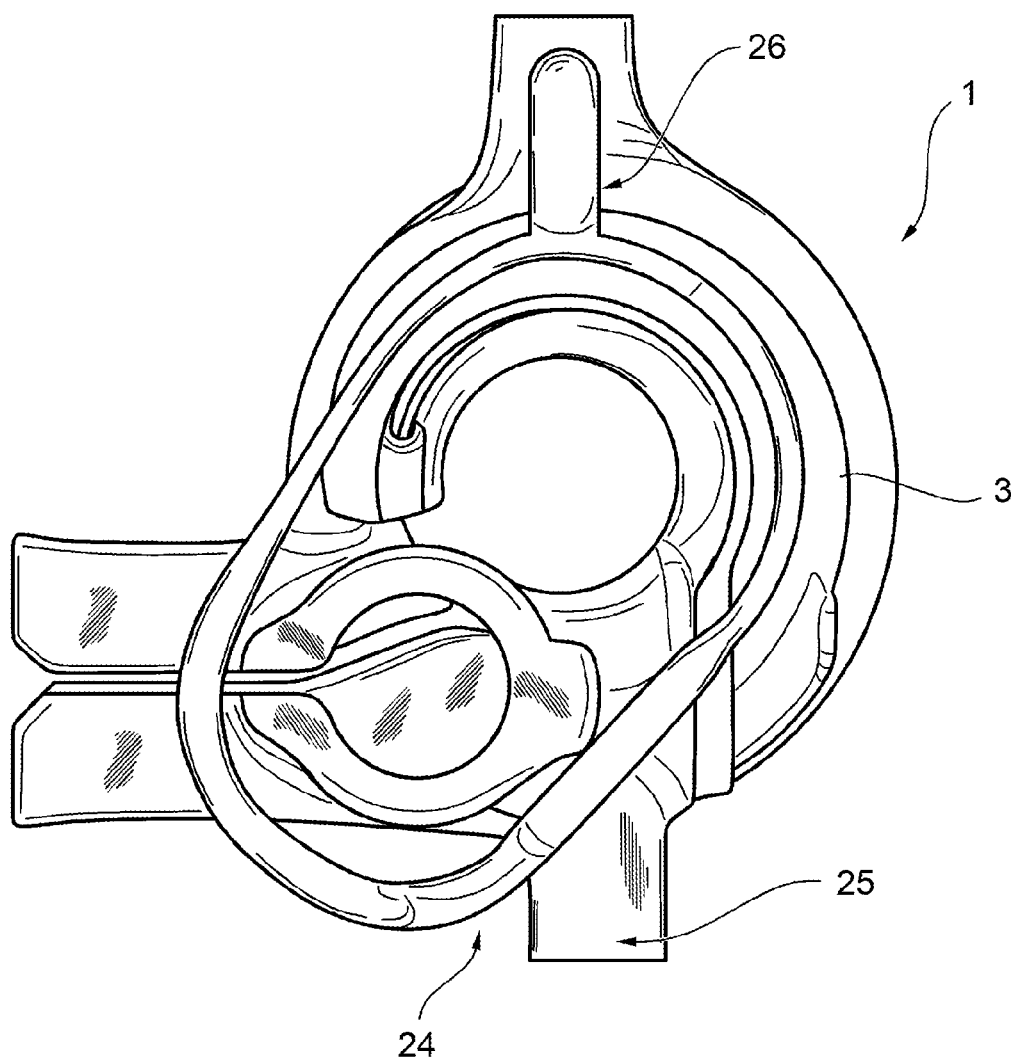
Figure 7:
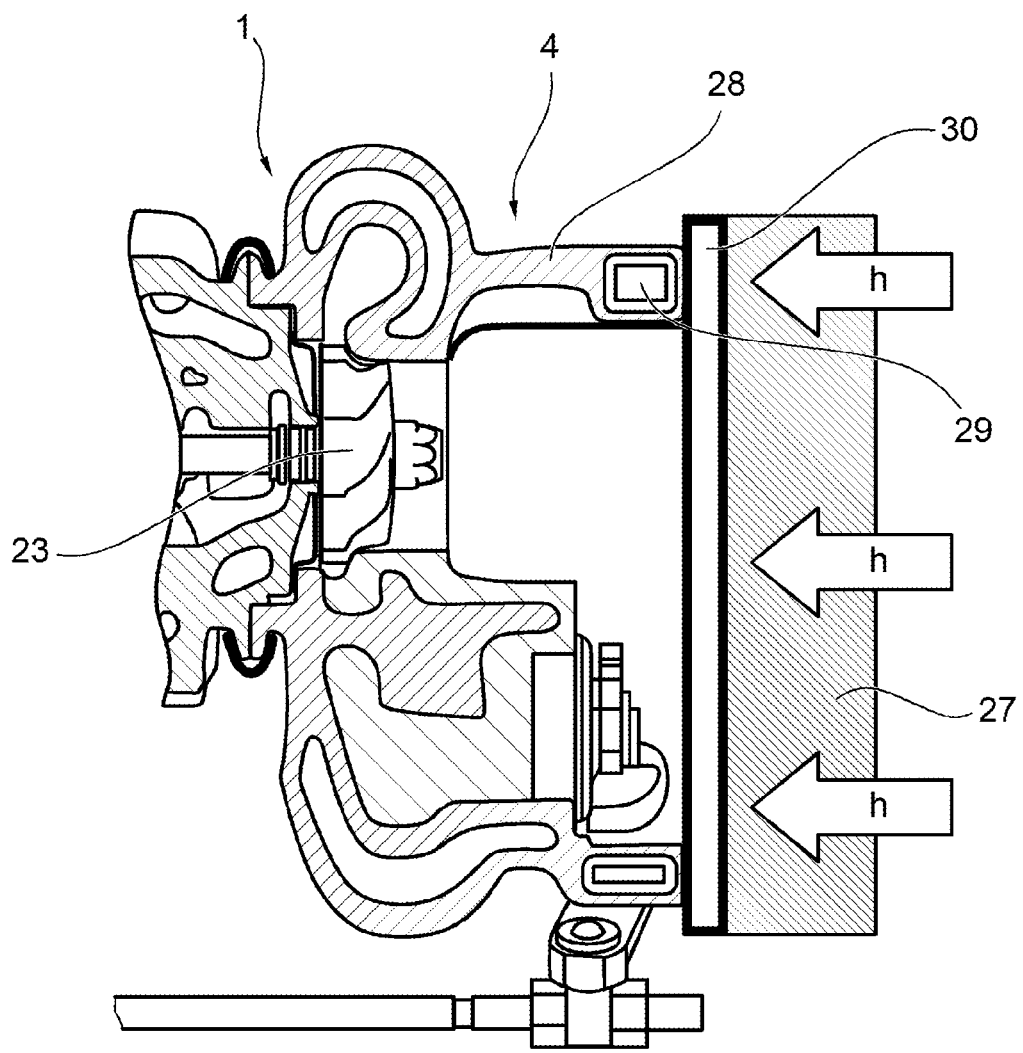
Figure 8:
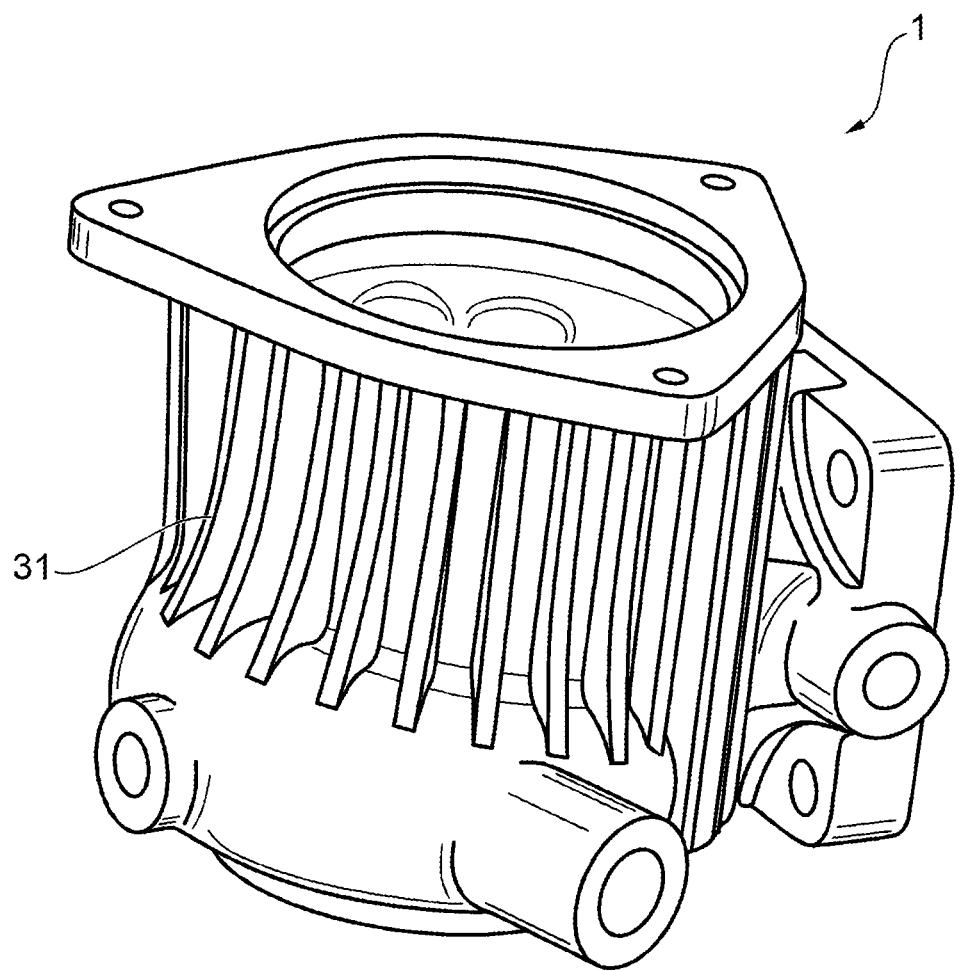
Figure 9:
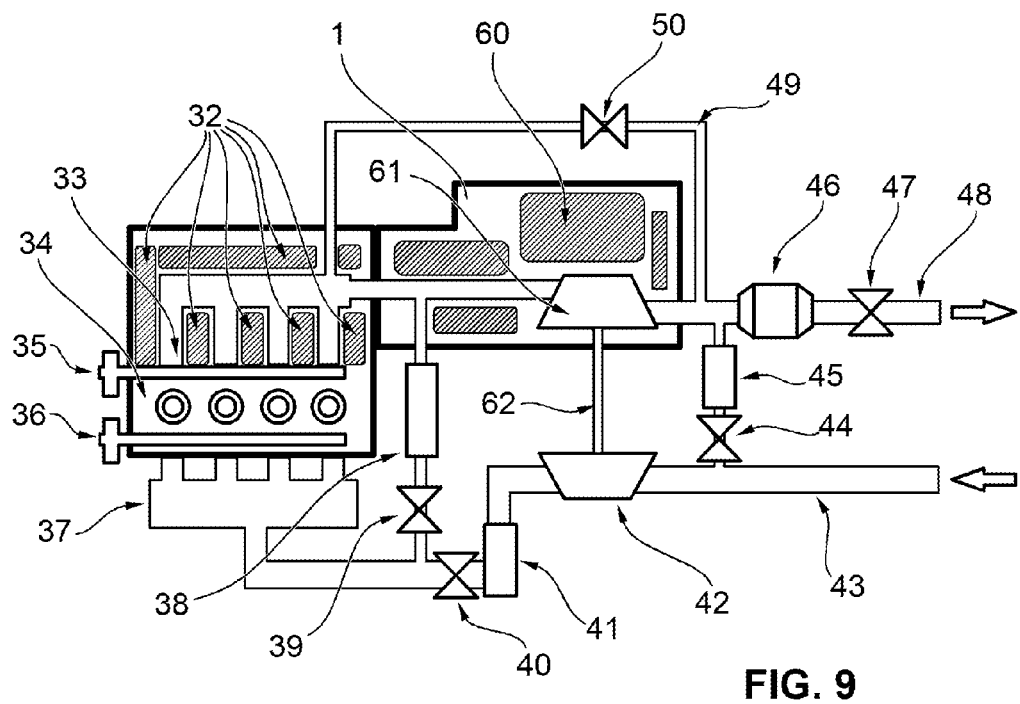
Figure 10:
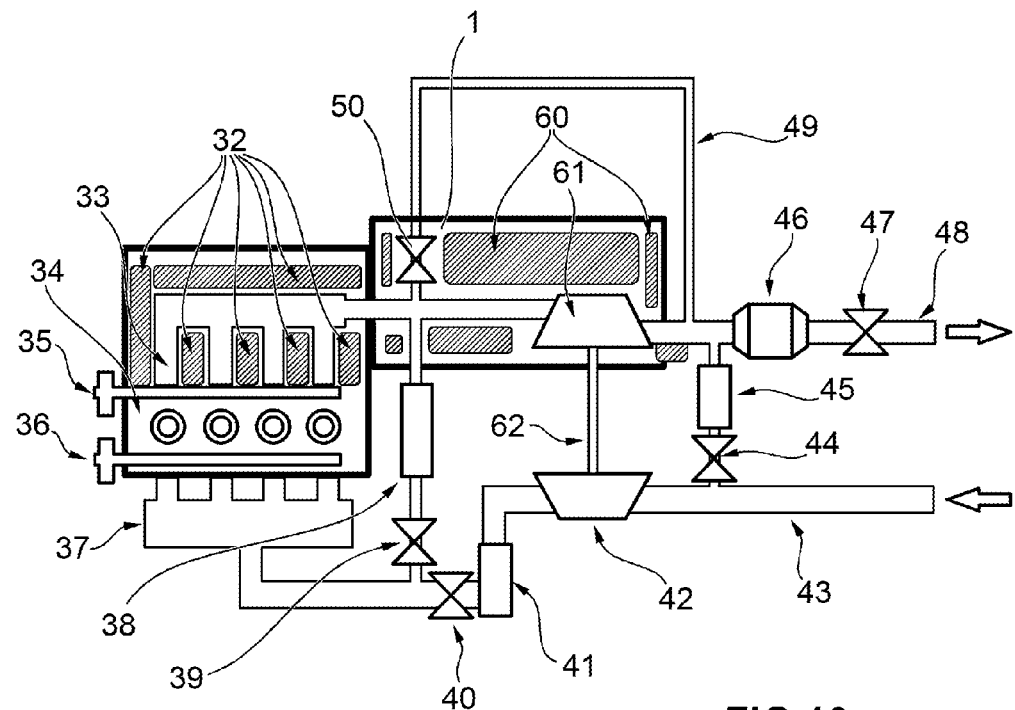
Figure 11:
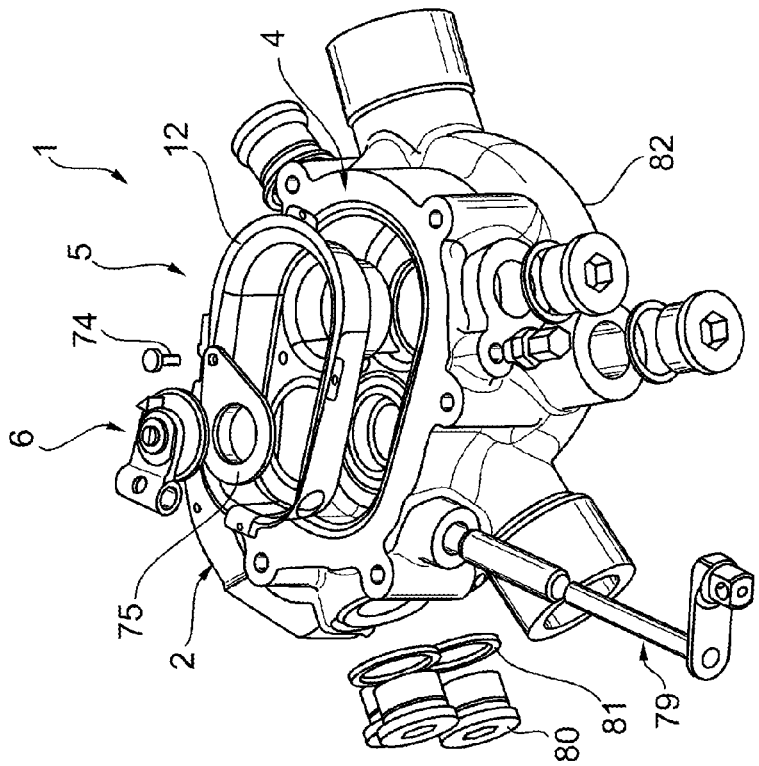
Figure 12:
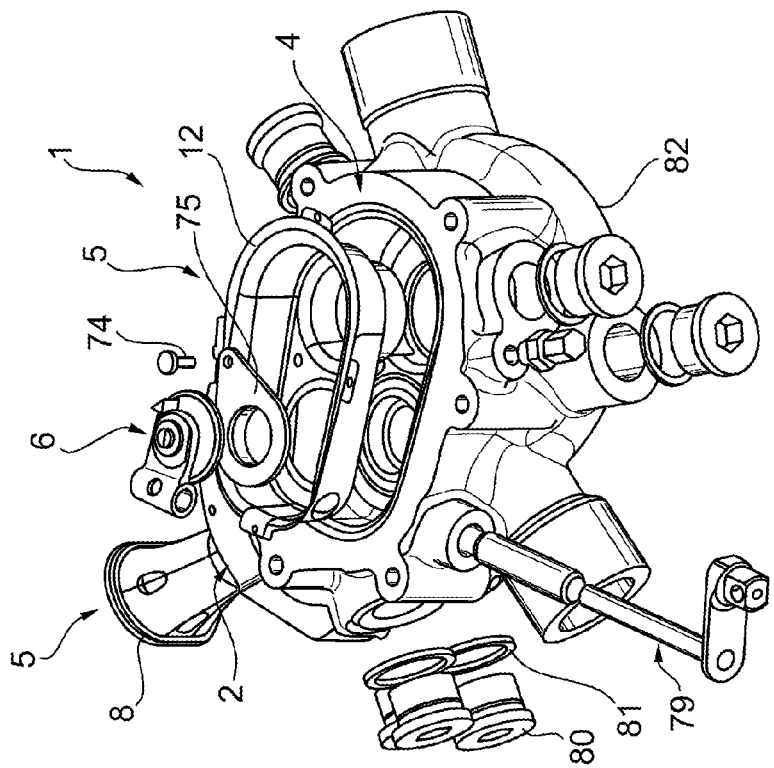
Figure 15:
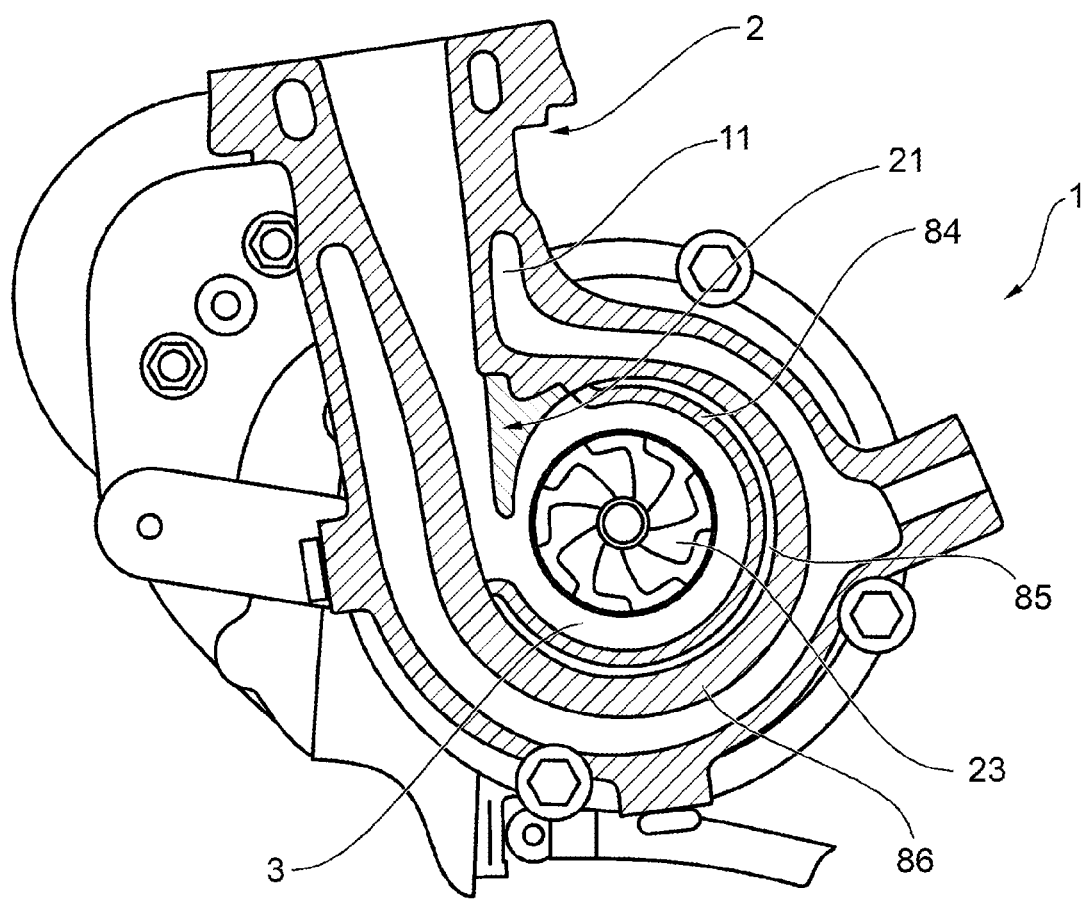
Figure 17:
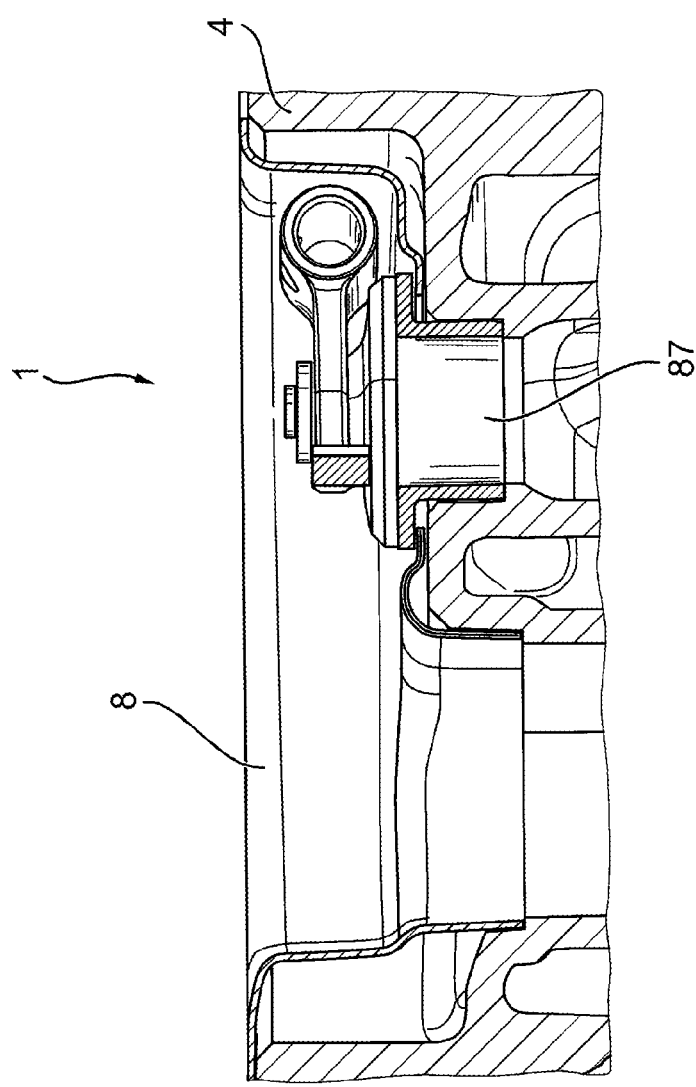
Figure 16:
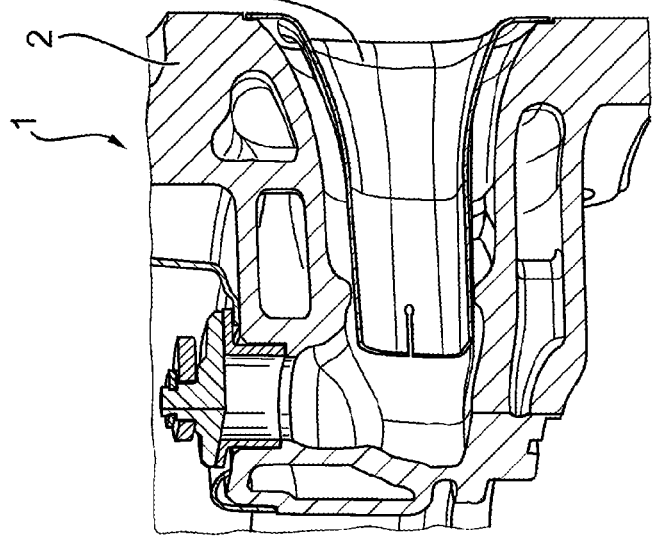

Further details, advantages and features of the present invention emerge from the following description of exemplary embodiments with reference to the drawing, in which:

FIG. 1 shows a schematically slightly simplified illustration of a first embodiment of a turbine casing according to the invention, FIG. 2 shows an illustration, corresponding to FIG. 1, of a second embodiment, FIG. 3 shows an illustration, corresponding to FIG. 2, of a third embodiment, FIG. 4 shows a schematically slightly simplified sectional illustration through a turbine casing according to the invention, according to a fourth embodiment, FIG. 5 shows a sectional illustration through a fifth embodiment of the turbine casing according to the invention, FIG. 6 shows a basic illustration of a sixth embodiment of a turbine casing according to the invention, FIG. 7 shows a schematically simplified illustration of a seventh embodiment of the turbine casing according to the invention, FIG. 8 shows a perspective illustration of an eighth embodiment of the turbine casing according to the invention, FIG. 9 shows a block diagram of a ninth embodiment of the turbine casing according to the invention, as part of an exhaust-gas turbocharger according to the invention which is fitted on an internal combustion engine, FIG. 10 shows an illustration, corresponding to FIG. 9, of a tenth embodiment of the turbine casing according to the invention, as part of a further embodiment of the exhaust-gas turbocharger according to the invention, FIGS. 11 and 12 show perspective illustrations of further embodiments of the turbine casing according to the invention, FIGS. 13 and 14 show perspective illustrations of some basic components from the embodiments shown in FIGS. 11 and 12, FIG. 15 shows a sectional illustration through a further embodiment of the turbine casing according to the invention, FIG. 16 shows a schematically slightly simplified illustration for explaining the arrangement of a heat shield in the inlet region of a turbine casing, and FIG. 17 shows an illustration, corresponding to FIG. 16, for explaining the arrangement of the heat shield in the outlet region of the turbine casing.

FIG. 1 shows a first embodiment of a turbine casing 1 according to the invention having an inlet connection piece 2 and an outlet connection piece 4. The spiral 3 is arranged between the inlet connection piece 2 and the outlet connection piece 4. FIG. 1 also shows a wastegate arrangement 6 as well as an insulating device 5 which is intended to reduce heat input and, in the example, is arranged in the region of the inlet connection piece 2. In the embodiment shown in FIG. 1, this insulating device 5 is in the form of a sleeve or an insert part 8 which, in the example, extends with a slightly conical design, as can be seen from the drawing of FIG. 1. The sleeve 8 extends from a fastening portion 9, via which the sleeve 5 can be fixed to the inlet connection piece 2, to a free end portion 9' which projects into the transition region into the spiral 3 in the inlet connection piece 2. In the example, the sleeve 8 is provided with a spacer, for example in the form of a bead 10, in the vicinity of this end region 9', and so the sleeve 5, instead of bearing against the inner wall of the inlet connection piece 2, forms a gap, in particular an air gap, which, according to the illustration selected in FIG. 1, can be seen in particular in the central region and is denoted by reference symbol 7.

In the embodiment shown, the turbine casing 1 is also provided with a cooling jacket 11 into which cooling liquid can be introduced. However, a cooling jacket of this type does not have to be provided, but is provided primarily in the case of aluminum casings.

With respect to all corresponding features, the embodiment shown in FIG. 2 is provided with the same reference symbols as in FIG. 1. In this embodiment, a thermal insulating device 5 is likewise provided in the form of a sleeve 12, but in the outlet connection piece 4. In turn, the sleeve 12, together with the inner wall of the outlet connection piece 4, forms a gap 15, in particular an air gap, and has a fastening portion 13, to which the sleeve 12 is fixed via a flange of the wastegate arrangement 6.

The opposite end of the sleeve 12 is provided with a fastening portion 14, via which said sleeve can be fixed to the outlet connection piece 4 in the region of the outlet opening thereof.

The embodiments shown in FIGS. 1 and 2 can also be combined, such that, in such a case, both the inlet connection piece 2 and the outlet connection piece 4 would be provided with an insulating device 5.

FIG. 3 shows a third embodiment of the turbine casing 1 according to the invention. This embodiment corresponds to the embodiment shown in FIG. 2. Merely a nonwoven material 15', which contains air inclusions and can therefore further improve the insulating effect, is introduced into the gap 15.

FIG. 4 shows a further embodiment of a turbine casing 1 according to the invention. The illustration chosen shows the inlet connection piece 2 and the spiral 3.

In this embodiment, a flow baffle plate 16 is fixed in the inlet connection piece 2, for example welded onto the inner wall 22 of the inlet connection piece 2 or fastened thereto in a form-fitting manner, for example by means of a screwed connection. This flow baffle plate 16 has a deflecting portion 17 which is arranged in the region of a tongue 21 of the turbine casing, rises up from the inner wall 22 of the inlet connection piece 2 and therefore assumes an angle with respect to the inner wall 22, as can be gathered from FIG. 4. This arrangement makes it possible to deflect the high-speed exhaust-gas flow (symbolized by the arrows 19 and 20), and this, together with the insulating effect of the flow baffle plate 16 itself, reduces the input of heat into the turbine casing 1. Here, the arrow 18 symbolizes the region in which there is a low through-flow rate.

FIG. 5 shows a fifth embodiment of the turbine casing 1 according to the invention, which is distinguished by the tongue 21 being designed as a steel or cast iron tongue. As shown in FIG. 5, this tongue 21 is located outside a region which could be cooled by the cooling jacket 11, and therefore an increased heat input is prevented by producing this tongue from a highly heat-resistant material and fixing it in the turbine casing in a suitable manner. In this respect, FIG. 5 shows that the tongue 21 opens out into the initial region of the spiral 3, adjacent to the turbine wheel 23.

FIG. 6 shows a sixth embodiment of a turbine casing 1 according to the invention, which is distinguished by the provision of a coolant arrangement 24 in the region of the spiral 3. The coolant arrangement 24 has a coolant inlet 25 at least approximately at the lowest point of the spiral 3 and a coolant outlet 26 at least approximately at the highest point of the spiral 3, and this makes it possible to achieve the siphon effect mentioned in the introduction.

FIG. 7 shows a seventh embodiment of the turbine casing 1 according to the invention. The schematically simplified illustration in FIG. 7 shows the connection between the outlet connection piece 4 and an exhaust tailpipe system 27 (shown in a schematically simplified form) of an internal combustion engine (not shown in more detail), which, particularly when the engine is switched off, brings about the input of heat into the turbocharger or the turbine casing 1 (symbolized by the three arrows h). The turbine casing 1 or the outlet connection piece 4 has a non-cooled region 28 which could be heated greatly by this heat input h. Accordingly, in the embodiment shown, an annular coolant duct 29 is provided at the end of the non-cooled region 28. This coolant duct 29 can be combined with a further thermal insulation 30 (symbolized by the black bar), for example in the form of a seal or some other thermal decoupling device. Alternatively, it is possible to provide only this decoupling device 30.

FIG. 8 shows an eighth embodiment of a turbine casing 1 according to the invention, which is provided on its outer surface with a plurality of cooling fins, of which one is denoted, as a representative of all the cooling fins, by reference symbol 31. These cooling fins increase the heat discharge to the surroundings, to which end it is possible, when the turbocharger is installed, to deliberately deflect the air flow onto these cooling fins 31 in order to further increase the cooling effect. This provides the advantageous effect that the supply of heat into the cooling system can automatically be reduced even by partial heat discharge to the surroundings.

FIGS. 9 and 10 show two further embodiments of a turbine casing 1 according to the invention, shown in a simplified form as a block around the turbine 61, here the block diagram showing the integration of the turbine 61 in an exhaust-gas turbocharger 62 with a compressor 42. Furthermore, the turbocharger 62 is shown in a simplified form, in a state in which it is fitted to an internal combustion engine 34.

The components of the internal combustion engine and of the intake and exhaust system are denoted by reference symbols 32 to 62, which are listed in the appended list of reference symbols.

The special feature of the embodiment shown in FIG. 9 is that here the turbine casing 1 is completely circumvented by the wastegate arrangement 49, 50. In this context, the wastegate line 29 branches off from the exhaust-gas manifold 33 and opens out into the exhaust-gas line 48 downstream of the turbine 61. The wastegate valve 50 is arranged in the wastegate line 49 outside the turbine casing 1.

By contrast, in the embodiment shown in FIG. 10, the wastegate valve 50 is integrated in the turbine casing 1 and only the wastegate line 49 is led around the turbine casing, such that this line opens out into the exhaust-gas line 48 downstream of the turbine 61 in this embodiment too.

FIGS. 11 and 12 show two further embodiments of a turbine casing 1 according to the invention. All parts which correspond to the components apparent from the above-described embodiments are provided with the same reference symbols.

In the embodiment shown in FIG. 11, the turbine casing 1 has an insulating device 5 both in its inlet connection piece 2 and in its outlet connection piece 4. Here, the insulating device 5 of the inlet connection piece 2 is in the form of a funnel-like sleeve 8, whereas the insulating device 5 of the outlet connection piece 4 is in the form of a trough-shaped sleeve 12. The sleeves 8 and 12 are described in detail below with reference to FIGS. 13 and 14.

As shown in FIGS. 11 and 12, the embodiment shown in FIG. 12 differs from that in FIG. 11 only in that here the trough-shaped sleeve 12 is provided only in the outlet connection piece 4, whereas no insulating device 5 is provided in the inlet connection piece 2.

As common features, FIGS. 11 and 12 also show an actuating linkage 79 for the wastegate arrangement 6, which can be designed in a conventional manner.

As common features, FIGS. 11 and 12 also each show a valve seat 5 and a pin 74, which are also described in more detail below with reference to FIGS. 13 and 14.

As common features, FIGS. 11 and 12 also each show five stoppers and five associated sealing rings, of which one stopper is denoted by reference symbol 80 as a representative and one sealing ring is denoted by reference symbol 81 as a representative.

These stoppers 80, together with their sealing rings 81, represent core end plugs which are either made from sheet metal and pressed in or are provided with an external thread which can be screwed into corresponding internal threads of the openings in the turbine casing 1 which are to be sealed.

These openings, which are sealed by the stoppers 80, are provided because sand located inside the turbine casing 1 has to be removed therefrom after casting.

FIG. 13 shows the sleeves 8 and 12 which have already been described above.

The sleeve 8 is a funnel-like sleeve which has a funnel 63 and an adjoining tubular portion 64. As described above with reference to FIG. 1, this funnel-shaped sleeve 8 can be inserted into the inlet connection piece 2 in order to form an air gap which, in FIG. 1, is denoted by reference symbol 7.

In the embodiment shown in FIG. 11 to 14, the insulating device 5, which is inserted into the outlet connection piece 4, is a trough-shaped sleeve 12 having a base wall 76 with two circular recesses 66 and 67 arranged therein. As can be seen from the illustration in FIGS. 13 and 14, a peripheral wall 65 having four clips 68, 69, 70 and 71 at its upper edge region rises up from this base wall 76. A smaller holding recess 73, which interacts with a pin 74 (which can be seen in FIG. 14), is also provided between the recesses 76 and 67. This pin 74 serves to fasten the valve seat 75 (which can also be seen in FIGS. 11 and 12), for which purpose the latter has a fixing portion 78 which is provided with a passage recess 77 through which the pin 74 can be guided so that it can be introduced into the holding recess 73 in the base wall 76.

The valve seat 75 has a circular passage recess 83 which is provided, on the lower edge according to FIG. 14, with a connection piece 84 which, when the valve seat 75 is assembled, engages into the recess 66.

When the sleeve 12 is assembled, the connection piece 72 of the sleeve 12 engages into an opening 82 (which can be seen in FIGS. 11 and 12) in the turbine casing 1.

FIG. 15 shows a sectional illustration of a further embodiment of the turbine casing 1 according to the invention, which substantially corresponds to the fifth embodiment shown in FIG. 5. Accordingly, all corresponding parts are provided with the same reference symbols.

However, the embodiment of the turbine casing 1 shown in FIG. 15 has an inner sheet metal shell 84 which, together with the wall 86 of the spiral 3, delimits an air gap 85. This inner sheet metal shell 85 can be produced either by being cast in or by inserting two shells into the spiral region. If two shells are provided, these are either divided normally over the wheel axis or longitudinally and are either screwed, welded or connected in some other way to the wall region 86 of the spiral 3, after the shell parts have been inserted into the spiral 3.

It is therefore possible to insulate the spiral as well, combinations with an insulating device in the inlet and/or outlet connection piece again being possible.

FIG. 16 shows part of a further embodiment of the turbine casing 1 according to the invention. In this case, the sleeve or the heat shield 8, which can be in the form of a thin-walled sheet metal part, is arranged in the inlet region 2.

For this purpose, the heat shield 8 is pushed into the turbine casing 1 or the inlet region 2 from the front. The heat shield 8 preferably only makes contact with the inlet connection piece or inlet flange 2 by way of an inner linear contact.

In order to install the heat shield 8, it is possible to widen it using suitable tools during assembly.

In this context, contact only at the inlet connection piece or inlet flange 2 is also exclusively conceivable.

This has the advantageous effect of minimizing the contact surface in the inlet flange 2, and this means that complete contact around the entire circumference can be avoided.

Furthermore, it is optionally possible to arrange a thermal insulation material (not shown in FIG. 16) in the air gap between the heat shield 8 and the inlet connection piece 2.

In the embodiment according to FIG. 17, the heat shield 8 is arranged in the outlet connection piece 4 of the turbine casing 1. For this purpose, the heat shield 8 is pushed into the turbine casing 1 from the rear. A wastegate bushing 87 can then be used to fix said heat shield against loss during assembly.

In this context, it is likewise possible to make it possible to minimize the contact surface on the flange 4 (avoid contact around the entire circumference).

Furthermore, it is likewise possible to provide thermal insulation material in the air gap between the heat shield 8 and the outlet connection piece 4.

Finally, it is possible to press the heat shield 8 into the inner region of the outlet connection piece 4 or to arrange said heat shield therein with play.

For all of the embodiments described above, a composite aluminum/steel or aluminum/magnesium casting is possible.

In addition to the above written disclosure, reference is hereby made explicitly, in order to supplement the disclosure, to the drawings of the invention in FIG. 1 to 17.

LIST OF REFERENCE SYMBOLS

1 Turbine casing
2 Inlet connection piece
3 Spiral
4 Outlet connection piece
5 Insulating device
6 Wastegate arrangement
7 Gap/air gap
8 Sleeve/heat shield
Fixing portion
9' Free end portion
10 Spacer/bead
11 Cooling jacket for cooling liquid, in particular water
12 Sleeve
13, 14 Fixing portion
15 Gap/air gap
15' Nonwoven
16 Flow baffle plate
17 Deflecting portion
18 Region of low flow rate
19, 20 Exhaust-gas flow
21 Tongue
22 Inner wall
23 Turbine wheel
24 Coolant arrangement
25 Coolant inlet
26 Coolant outlet
27 Exhaust tailpipe/exhaust-gas line
28 Non-cooled portion
29 Annular cooling duct
30 Thermal decoupling device
31 Cooling fins
32 Coolant ducts
33 Exhaust-gas manifold
34 Internal combustion engine
35 Outlet cam
36 Inlet cam
37 Inlet manifold
38 High-pressure exhaust-gas recirculation cooler
39 High-pressure exhaust-gas recirculation valve
40 Throttle valve
41 Charge-air cooler
42 Compressor
43 Inlet line
44 Low-pressure exhaust-gas recirculation valve
45 Low-pressure exhaust-gas recirculation cooler
46 Catalytic converter
47 Outlet valve
48 Exhaust-gas lines
49 Wastegate line
50 Wastegate valve
60 Coolant jacket
61 Turbine
62 Exhaust-gas turbocharger
63 Funnel
64 Tubular portion
65 Peripheral wall
66, 67 Circular recess in the base wall 76
68-71 Clips
72 Cylindrical connection piece at the circular recess 67
73 Holding recess
74 Pin
75 Valve seat
76 Base wall
77 Passage recess
78 Fixing portion
79 Actuating linkage for the wastegate arrangement 6
80 Stopper
81 Sealing disk
82 Opening
83 Passage recess
84 Inner sheet metal shell
85 Air gap
86 Wall of the spiral 3

The invention claimed is:

1. A turbine casing (1) of an exhaust-gas turbocharger (62) having an inlet connection piece (2) adjoined by a spiral (3), and
having an outlet connection piece (4), characterized by
an insulating device (5) for reducing the input of heat into the inlet connection piece (2), the spiral (3) and/or the outlet connection piece (4), wherein the insulating device (5) comprises a wastegate arrangement (49, 50) which extends outside the turbine casing (1).

2. The turbine casing as claimed in claim 1, wherein the insulating device (5) comprises a sleeve (8) which can be inserted into the inlet connection piece (2) to form a gap (7).

3. The turbine casing as claimed in claim 1, wherein the insulating device (5) comprises a sleeve (12) which can be inserted into the outlet connection piece (4) to form a gap (15).

4. The turbine casing as claimed in claim 1, further comprising a sleeve (12) extending from the spiral (3), wherein the insulating device (5) comprises a fiber mat (15') which can be inserted into a gap (15) between the sleeve (12) and the inlet connection piece (2) and/or the outlet connection piece (4).

5. The turbine casing as claimed in claim 1, wherein the insulating device (5) comprises a ceramic inlay.

6. The turbine casing as claimed in claim 1, wherein the insulating device (5) comprises a coating which can be applied to the inner wall surface (22) of the turbine casing (1, 2).

7. The turbine casing as claimed in claim 1, further comprising a wastegate line (49) extending from the turbine casing (1) with a wastegate valve (50) arranged in the wastegate line (49), wherein both the wastegate line (49) and the wastegate valve (50) extend outside the turbine casing (1).

8. The turbine casing as claimed in claim 1, wherein only the wastegate line (49) extends outside the turbine casing (1).

9. The turbine casing as claimed in claim 1, wherein the insulating device (5) comprises a coolant arrangement (24), a coolant inlet (25) of which is arranged at least approximately at the lowest point of the spiral (3), and a coolant outlet (26) of which is arranged at least approximately at the highest point of the spiral (3).

10. The turbine casing as claimed in claim 1, wherein the insulating device (5) comprises an annular coolant duct (29) and/or a thermal heat-decoupling device (30).

11. The turbine casing as claimed in claim 1, wherein it is in the form of a cast aluminum casing and has a cooling device (11).

12. A turbine casing (1) of an exhaust-gas turbocharger (62)
having an inlet connection piece (2) adjoined by a spiral (3), and
having an outlet connection piece (4), characterized by
an insulating device (5) for reducing the input of heat into the inlet connection piece (2), the spiral (3) and/or the outlet connection piece (4) wherein the inlet connection piece (2) has an inner wall (22), wherein the insulating device (5) comprises a flow baffle plate (16) which can be positioned in the inlet connection piece (2) against the inner wall (22), wherein the flow baffle plate (16) has a deflecting portion (17) extending away from the inner wall (22) to deflect exhaust gas away from the inner wall (22).

13. A turbine casing (1) of an exhaust-gas turbocharger (62)
having an inlet connection piece (2) adjoined by a spiral (3), and
having an outlet connection piece (4), characterized by
an insulating device (5) for reducing the input of heat into the inlet connection piece (2), the spiral (3) and/or the outlet connection piece (4), wherein the insulating device (5) comprises a steel tongue (21) which can be inserted into the entry region of the spiral (3).

14. A turbine casing (1) of an exhaust-gas turbocharger (62),
having an inlet connection piece (2) adjoined by a spiral (3), and
having an outlet connection piece (4), characterized by
an insulating device (5) for reducing the input of heat into the inlet connection piece (2), the spiral (3) and/or the outlet connection piece (4), wherein the outlet connection piece (4) comprises a sleeve (12) extending from the spiral (3) and the sleeve (12) terminating in a fastening portion (14), and the turbine casing having an outer surface,
wherein the insulating device (5) comprises cooling fins (31) on the outer surface of the turbine casing (1), the cooling fins (31) extending from the spiral (3) to the fastening portion (14), and the cooling fins (31) disposed around the sleeve (12).

* * * * *